United States Patent [19]

Ginter et al.

[11] 4,408,001
[45] Oct. 4, 1983

[54] DEGENERATION INHIBITED SANITIZING COMPLEXES

[75] Inventors: Sally P. Ginter, Sanford; Percy J. Hamlin, Midland, both of Mich.

[73] Assignee: The Dow Chemical Company, Midland, Mich.

[21] Appl. No.: 251,626

[22] Filed: Apr. 6, 1981

[51] Int. Cl.$^3$ .............................................. C08L 79/04
[52] U.S. Cl. .................................. 524/376; 524/377; 524/386; 524/389; 524/391; 524/612; 424/78
[58] Field of Search .................. 260/29.2 N; 524/389, 524/612, 376, 377, 386, 391; 528/403; 424/78

[56] References Cited

U.S. PATENT DOCUMENTS

| | | | |
|---|---|---|---|
| 2,739,922 | 3/1956 | Shelanski | 424/80 |
| 2,826,532 | 3/1958 | Hosmer | 424/80 |
| 2,900,305 | 8/1959 | Siggia | 424/80 |
| 3,028,300 | 4/1962 | Cantor et al. | 424/80 |
| 3,898,326 | 8/1975 | Cantor et al. | 424/80 |
| 4,017,407 | 4/1977 | Cantor et al. | 252/106 |
| 4,131,556 | 12/1978 | Klopotek et al. | 252/106 |
| 4,144,211 | 3/1979 | Chamberlin et al. | 260/29.2 R |

FOREIGN PATENT DOCUMENTS 1319413 6/1973 United Kingdom .

OTHER PUBLICATIONS

Block, "Disinfection, Sterilization and Preservation" 2nd Ed. 1977, Chapt. 11, pp. 196-218.
Keller, et al.; *Current Therapeutic Research*, vol. 24, No. 6, pp. 673-681, (Oct. 1978).

*Primary Examiner*—Theodore E. Pertilla
*Attorney, Agent, or Firm*—Charles J. Enright

[57] ABSTRACT

A composition comprises
(a) a polymer containing a characterizing amount of units of the formula

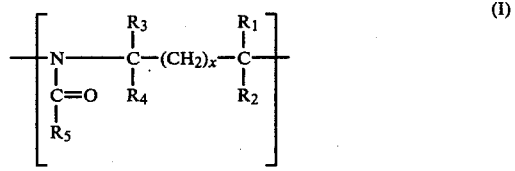

wherein $R_1$-$R_4$ are independently hydrogen, methyl or ethyl and wherein $R_5$ is hydrogen or an alkyl radical containing 1 to 3 carbon atoms and x is 0 or 1;
(b) $IBr_2^-$, $IBrCl^-$, $BrCl_2^-$ or mixtures thereof;
(c) a cation selected from the group consisting of hydrogen ion, alkali metal ions, alkaline earth metal ions, ammonium ion and mixtures thereof; and
(d) water; and which has been inhibited against degeneration by a degeneration inhibiting amount of an alcohol of the formula $$R-(OCH_2CH_2)_n-OH$$

wherein R is hydrogen, an aliphatic radical containing 1 to 3 carbon atoms or a hydroxyl substituted aliphatic alkyl radical containing 2 or 3 carbon atoms and n is a number from 0 to 3 with the proviso that when R contains 3 carbon atoms and no hydroxyl groups, the n≠0. The stabilized complexes are useful as sanitizers.

18 Claims, No Drawings

DEGENERATION INHIBITED SANITIZING COMPLEXES

BACKGROUND OF THE INVENTION

1. Field of the Invention

The invention relates to a method of stabilizing aqueous poly-2-oxazoline complexes with certain polyhalide ions by use of a lower alkanol in an amount sufficient to prevent loss of available halogen. The invention also relates to the compositions formed and a method of using the compositions as sanitizing agents.

2. Description of the Prior Art

Halophors have long been known and the art is replete with various classes of halophors, processes for their manufacture, and a myriad of their alleged utilities. See, for example, *Disinfection, Sterilization and Preservation,* 2nd Edition, Chapter 11, Lea & Febiger (Philadelphia 1977) by S. S. Block. Of the many known halophors, probably the most common are those prepared from iodine ($I_2$) and polyvinylpyrrolidone. These materials are generally complexes of indefinite composition and are generally soluble in water. When solubilized, these complexes slowly liberate free iodine which is the active ingredient. These complexes can contain up to about 25 weight percent iodine although not all is available (titratable with $Na_2S_2O_3$) due to some being organically bound to the polymr. Many patents have issued regarding these complexes and U.S. Pat. Nos. 4,017,407; 3,898,326; 3,028,300; 2,900,305; 2,826,532 and 2,739,922 are exemplary.

Halophors or complexes of polyoxazolines or polyoxazines and halogens, interhalogens and pseudo-halogens, are described in U.S. Pat. No. 4,144,211 to Chamberlin and Bangs. These complexes represent a class of halophors distinct from the complexes of polyvinylpyrrolidone and have demonstrated utility as sanitizing agents.

Halophor complexes of polyoxazolines or polyoxazines and polyhalide anions are described in our copending U.S. patent application Ser. No. 139,306 filed Apr. 11, 1980, which is a continuation-in-part of U.S. patent application Ser. No. 030,396 filed Apr. 16, 1979, both of which are hereby incorporated by reference.

These two applications describe water-soluble complexes, useful as sanitizing agents, comprising (a) a poly-2-oxazoline or poly-2-oxazine polymer; (b) a polyhalide anion of the formula $(XY_{2n})-$ where X and Y are individually chlorine, bromine or iodine, but not both chlorine, and $n$ is 1, 2 or 3; and an independently supplied cation selected from the group consisting of alkali metals, alkaline earth metals, hydrogen and mixtures thereof. These materials are prepared at room temperature in either an aqueous or anhydrous environment and are significantly more stable than complexes of either poly-2-oxazoline or poly-2-oxazine and halogen, interhalogen or pseudo-halogen or complexes of polyvinylpyrrolidone and polyhalides. Certain species of these compositions may, however, degenerate upon aging. Degeneration is the loss of available halogen by chemical combination with other components of the composition or by formation of insoluble precipitates.

It is an object of this invention to obtain a composition which is degeneration inhibited in accelerated aging tests, which will form a solids-free solution which does not separate on standing.

It is a further object of this invention to provide a method for degeneration inhibiting complexes containing poly-2-oxazolines or poly-2-oxazines and certain polyhalide anions.

It is a still further object of this invention to provide a method for sanitizing substrates with a degeneration inhibited sanitizing complex.

SUMMARY OF THE INVENTION

The objects of this invention are achieved by a composition comprising (a) a polymer containing a characterizing amount of units of the formula:

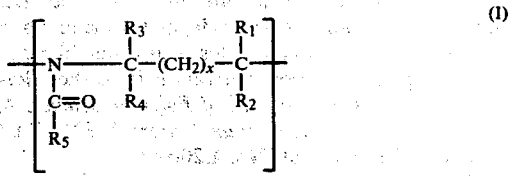

wherein $R_1$-$R_4$ are hydrogen, methyl or ethyl, and wherein $R_5$ is hydrogen or an alkyl radical containing one to three carbon atoms and x is 0 or 1;

(b) $IBr_2^-$, $IBrCl^-$, $BrCl_2^-$ or mixtures thereof;

(c) a cation selected from the group consisting of hydrogen ion, alkali metal ions, alkaline earth metal ions, ammonium ion, and mixtures thereof, said cation being obtained from a source independent of the polymer;

(d) water; and (e) a degeneration inhibiting amount of an alcohol of the formula

wherein R is hydrogen, an aliphatic radical containing one to three carbon atoms, or a hydroxyl-substituted aliphatic radical containing 2 or 3 carbon atoms, and n is a number from 0 to 3 with the proviso that when R contains 3 carbons and no hydroxyl groups that $n \neq 0$.

In another aspect the invention comprises a method of inhibiting degeneration of the composition of (a)-(d) above by the addition of a degeneration inhibiting amount of (e). In still another aspect the invention comprises a method for sanitizing a substrate comprising contacting the substrate with a composition containing (a)-(e).

DETAILED DESCRIPTION OF THE INVENTION

The poly-2-oxazolines and poly-2-oxazines here used are known compounds which may consist essentially of units (I) randomly joined. These are readily prepared by the ring-opening polymerization of oxazolines or oxazines (II).

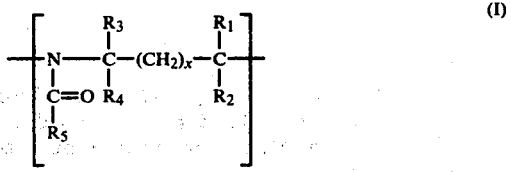

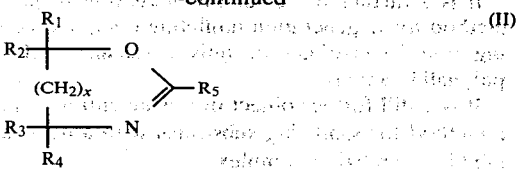
(II)

The substituents and subscript are later defined. The ring-opening polymerization is generally conducted in the presence of a cationic polymerization catalyst at a reaction temperature of about 0°–200° C. Typical catalysts include strong mineral acids, organic sulfonic acids and their esters, acidic salts such as ammonium sulfate, Lewis acids such as aluminum trichloride, stannous tetrachloride, boron trifluoride, and organic diazonium-fluoroborates, dialkyl sulfates, and other like catalysts. This ring-opening polymerization is further described by Tomalia et al., *Journal of Polymer Science*, 4, 2253 (1966); Bassiri et al., *Polymer Letters*, 5, 871 (1967); and Seeliger, German Pat. No. 1,206,585.

The polymers thereby obtained are linear, poly-2-oxazolines or poly-2-oxazines containing a characterizing amount of units (I). By a characterizing amount, it is meant an amount sufficient to permit the resultant polymer to exhibit the properties of poly-2-oxazolines or poly-2-oxazolines both known to the art and as hereinafter described.

The polymers are easily deacylated by acid or base hydrolysis but since hydrolysis (deacylation) is generally best controlled under acidic conditions, acid hydrolysis is preferred. The partially deacylated poly-2-oxazolines or poly-2-oxazines thus may have a molecular structure consisting essentially of m randomly joined units (I) and (III), illustratively depicted as (IV):

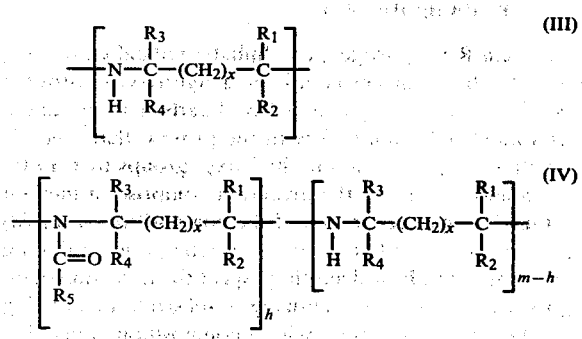

wherein m is the total number of units; h is the number of acylated units; and m-h is the number of deacylated units.

"Poly-2-oxazolines" and "poly-2-oxazines" here include both the fully acylated and partially deacylated polymers. Partially deacylated polymrs have at least one acyl group $(R_5C=O)$ per polymer chain, i.e. h is at least one. Preferably, the polymers here used are no more than about 50 percent deacylated (h is at least about 50 percent of m) and most preferably no more than about 25 percent deacylated (h is at least about 75 percent of m). Fully acylated or nondeacylated polymers (h is at or is at about 100 percent of m) are most preferred.

As regards the substituents and subscript in the above formulae, $R_1$–$R_4$ are independently hydrogen, methyl or ethyl and $R_5$ is hydroen, or an alkyl radical containing 1 to 3 carbon atoms, and x is 0 (an oxazoline) or 1 (an oxazine). Exemplary $R_5$ substituents include hydrogen, methyl, ethyl and propyl.

Any member of the known classes of poly-2-oxazolines and poly-2-oxazines can be used. Examples of suitable monomers from which the polymers (the term as here used includes copolymers) can be prepared include 2-H-2-oxazoline, 2-methyl-2-oxazoline, 2-ethyl-2-oxazoline, 2-propyl-2-oxazoline, 2-ethyl-4-methyl-2-oxazoline, 2-ethyl-5-methyl-2-oxazoline, 2-ethyl-5-dimethyl-2-oxazoline, 2-H-2-oxazine, 2-methyl-2-oxazine, 2-ethyl-2-oxazine, and the like, and combinations thereof. Poly-2-oxazolines (x is 0) are preferred to the poly-2-oxazines (x is 1) and poly-2-oxazolines wherein $R_1$–$R_4$ are hydrogen and $R_5$ is an alkyl radical of 1–3 carbon atoms are more preferred. Homopolymers prepared from either 2-ethyl-2-oxazoline (V) or 2-methyl-2-oxazoline (VI) are especially preferred.

Other polymers useful for preparing the complexes of this invention, are water soluble functionalized polymers, i.e. polymers prepared from a hydrophobe-initiated, ring-opening polymerization of 2-oxazoline and/or 2-oxazine monomers. These water soluble functionalized polymers are characterized by the presence of a hydrophobe radical attached to either or both (typically just one) terminal mer units of the polymer and can be illustratively depicted as

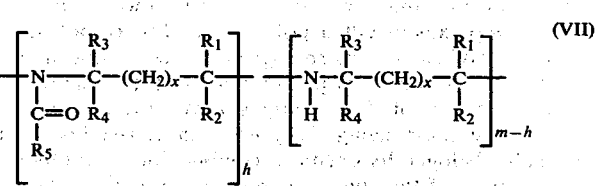

where the substituents and subscripts are as previously defined. Any organic compound that can initiate a ring-opening polymerization of 2-oxazoline and/or 2-oxazine monomer and which imparts detectable hydrophobic character to the resulting polymer can become the hydrophobe of the functionalized polymer. Typical of such compounds are the sulfonyl halide of long chain hydrocarbons, such as $C_8$-$C_{40}$ alkyls, aralkyls, etc.; esters of organic acids; $C_8$-$C_{40}$ alkyl halides; diphenyl ether sulfonyl halides; and the like. Polyisobutylene and dodecylbenzene sulfonyl chloride are illustrative. The functionalized polymers exhibit desirable surfactant properties and when complexed with polyhalide anions, provide a most unique sanitizing agent. The invention requires that the functionalized polymer contain enough hydrophilic mer units (I) that the resulting polymer is water soluble. That is an aqueous solution may contain at least 10 percent by weight of the polymer under normal conditions.

Polymers of this invention consisting essentially of mer units (I) and/or (III) typically have a weight average molecular weight of at least about 10,000 as determined by gel permeation chromatography. More typically, these compounds have an minimum average molecular weight of about 20,000 and preferably of about 100,000. Practical considerations, such as preparation, handling, and the like are the only limitations upon the maximum average molecular weight of these polymers, although convenience prefers a maximum of about 800,000 and more preferably, of about 500,000.

The functionalized polymers typically contain less than about 20 mer units, and more typically less than about 10 mer units, and thus have a typical maximum molecular weight less than about 3000, and more typically less than about 1000. Typically, these polymers comprise at least two mer units and more typically at least about 4 mer units and thus have a typical minimum molecular weight of at least about 250, and more typically of at least about 500. Obviously, the exact molecular weight of these polymers, especially the polymers of few mer units, is significantly dependent upon the molecular weight of the hydrophobe. Also obviously, the molecular weight of these polymers, and the polymers consisting essentially of mer units (I) and/or (III) as well, are impacted by the definitions of $R_1$-$R_5$ and x. Thus where $R_1$-$R_5$ are the larger members (based in molecular weight) of their respective classes, the 3000 typical maximum molecular weight for functionalized polymers may be exceeded.

Complexes of polyvinylpyrrolidone and polyhalide anion contain at least minor amounts of bound halogen, i.e. halogen chemically bound to the polymer. The bound halogen in these polymers is lost halogen, i.e., halogen not available for sanitizing purposes, and is thought to be a result of uptake of the halogen by the technical unsaturation of the polyvinylpyrrolidone. Since the polymers of 2-oxazoline and/or 2-oxazine have no such unsaturation, the amount of bound halogen present in the instant complexes is essentially nil.

Component (b) of the compositions are polyhalide anions formed by the combination of interhalogens such as bromine chloride or iodine bromide with halide anions such as chloride or bromide. As such, the complexes of this invention contain some amounts of all three entities, i.e., polyhalide anion, interhalogen, and halide anion. The polyhalide is present in the complex when the interhalogen and halide are combined in a mole ratio of less than about 10:1, and preferably less than about 2.5:1. The typical minimum ratio of interhalogen to halide is 1:2 and preferably 1:1. Such ratios of interhalogen to halide insure the formation of polyhalide anion in the complex.

The polyhalide anions here used are $IBr_2^-$, $BrCl_2^-$ and $IBrCl^-$. $IBr_2^-$ is preferred. $IBr_2^-$ is made my adding the interhalogen IBr to bromide ion. IBr is made by physically mixing equimolar amounts of iodine and bromine and allowing the two to react. See *Advanced Inorganic Chemistry*, Cotton and Wilkinson, pg. 589+, Interscience Publishers (1967), which describes a method for making these polyhalide anions. $IBrCl^-$ is made by adding IBr to chloride ion. $BrCl_2$ is made by adding BrCl or bromine chloride to chloride ion.

The weight ratio of polymer to polyhalide anion of the complexes of this invention can vary considerably. Typically, the polymer:polyhalide anion weight ratio ranges from about 99:1 to about 50:50 and, preferably from about 90:10 to about 70:30.

The counterions here used are cations selected from the group consisting of alkali metals, alkaline earth metals, hydrogen, ammonium ion and mixtures thereof. Typical cations include hydrogen, sodium, potassium, lithium, magnesium and calcium. Preferred cations are sodium, potassium and hydrogen, with potassium being most preferred.

It is a characteristic of this invention that the counterions are not taken from the polymer. In prior art compositions, as halogen is organically bound, hydrogen cations can become available. The cations of the present invention are independently supplied from sources external to polymer, that is they are added to the composition.

The most typical source of the cations is a halide salt which is contacted with the halogen to convert the halogen into a polyhalide. For example, KBr is contacted with IBr to form $KIBr_2$. The potassium cation comes from a source external to the polymer. It is understood that the cation may be incorporated into the composition in numerous ways, and such ways are contemplated by the invention as long as the cations have a source external to the polymer.

The independently supplied cation will be present in an amount of at least 90 percent of the stoichiometric equivalent of the polyhalide anion. Most preferably the cation will be present in an amount equal to the stoichiometric equivalent of the polyhalide anion, although a stoichiometric excess of the cation is feasible and is contemplated by the subject invention.

Water is present in the composition of the invention. The water does not contain impurities which would substantially interfere with the complexation of the halogen or the stabilizing effect of the alcohol. Preferably, the water is present in an amount to effect a solids-free solution of the remaining ingredients.

The alcohols of the invention have the formula $$R\text{---}(OCH_2CH_2)_n\text{---}OH$$

wherein R is hydrogen, an aliphatic alkyl radical having 1 to 3 carbon atoms or a hydroxyl-substituted aliphatic alkyl radical having 2 to 3 carbon atoms and n is 0–3.

$C_1$-$C_3$ aliphatic radicals include methyl, ethyl, n-propyl, and isopropyl. Hydroxyl-substituted $C_1$-$C_3$ radicals include 2-hydroxyethyl, 2,3-dihydroxypropyl, etc. When R contains 3 carbon atoms and is not hydroxyl substituted, then n cannot be 0. In other words n-propanol and isopropanol are not degeneration inhibiting alcohols of this invention.

Representative alcohols include: methanol, ethanol, ethylene glycol, glycerine, 2-ethoxyethanol, 2-methoxyethanol, diethylene glycol, triethylene glycol, CH$_3$CH$_2$—OCH$_2$CH$_2$—OCH$_2$CH$_2$OH,
CH$_3$—OCH$_2$CH$_2$—OCH$_2$CH$_2$—OH,
CH$_3$CH$_2$CH$_2$—OCH$_2$CH$_2$—OCH$_2$CH$_2$—OH,
(CH$_3$)$_2$CH$_2$—OCH$_2$CH$_2$—OCH$_2$CH$_2$—OCH$_2$CH$_2$OH.
Methanol and 2-methoxyethanol are preferred and methanol is most preferred.

The alcohol is added in an amount sufficient to inhibit degeneration of the available halogen until it can react as an oxidant and/or sanitizer. The minimum added may be any amount which inhibits degeneration over that possessed by the uninhibited complex. Degeneration means the loss of available halogen as determined by thiosulfate titration. The halogen is lost by reaction with other components of the mixture and/or by precipitation as a solid. This halogen is no longer available for sanitizing in aqueous solutions.

While the quantity required varies from one alcohol to another and with the degree of stability required, generally 5 percent by weight based on the total solution weight is sufficient. The maximum alcohol added is governed by economic and dilution considerations, remembering that it is desirable for concentrates to maximize the concentration of available halogen. Generally, 20 percent by weight based on the total solution weight is more than sufficient to inhibit degeneration.

The alcohol may also be added in ratio to the total complex weight. The minimum ratio of alcohol to complex ratio is that required to impart any inhibition of degradation. This varies depending on the alcohol but generally calls for a minimum alcohol to complex ratio of 1:12 and preferably 1:10. The ratio of alcohol to complex is generally less than about 1:2 and preferably less than about 1:3.

The stabilized complexes of this invention are readily prepared at room temperature. The aqueous complex is made by a method comprising contacting a polymer comprising a plurality of ring-opened units of a 2-oxazoline or 2-oxazine monomer corresponding to the formula

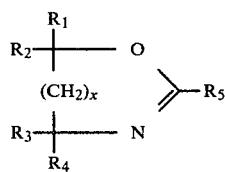

(II)

where R$_1$–R$_5$ and x are as defined above; IBrCl$^-$, IBr$^-$, BrCl$_2^-$ or mixtures thereof; an independently supplied counterion selected from the group consisting of alkali metals, alkaline earth metals, hydrogen, ammonium and mixtures thereof; water; and a stabilizing amount of an alcohol of the formula R—(OCH$_2$CH$_2$)$_n$—OH wherein R and n are as defined above.

The order of contacting the ingredients is generally not critical. One may advantageously prepare the interhalogen in a closed container and then add either a dry halide salt or a slurry of the halide salt in water. The appropriate amount of water is then added to obtain the desired polyhalide solution. The polyhalide solution and a solution of the polymer are then contacted to form the complex. Generally only agitation is necessary to obtain a solids free solution. The alcohol may be added to the aqueous polyhalide to assist in solubilization with the polymer or after formation of the complex.

Complexes, comprising poly-2-oxazoline or poly-2-oxazine; IBrCl$^-$, IBr$_2^-$, BrCl$_2$, or mixtures thereof, an independently supplied counterion selected from the group consisting of alkali metals, alkaline earth metals, hydrogen, ammonium and mixtures thereof; and water, are inhibited against degradation by admixing them with a degradation inhibiting amount of an alcohol of the formula R—(OCH$_2$CH$_2$)$_n$—OH wherein R and n are as defined above.

The degradation inhibited complexes of this invention are used in the same manner as known halophor complexes. These stabilized complexes are useful as sanitizing agents due to their oxidative properties and thus find a multiplicity of uses in the medicinal and purification arts. Moreover, these complexes can be used in combination with other materials such as anionic and non-ionic detergents, or in combination with other halophors.

The complexes of this invention can be used in a method for sanitizing or disinfecting a substrate contaminated with microorganisms comprising contacting the composition of the invention with the substrate. The contacting may be affected by dipping the substrate into the composition of the invention, but is preferably carried out by washing or scrubbing the substrate with the sanitizer or a formulation of the sanitizer with other materials such as detergents or other halophors. All conventional methods of contacting known to the art are encompassed by the scope of the invention.

This work is an improvement on our earlier work with poly-2-oxazoline/poly-2-oxazine-polyhalide complexes. The addition of the alcohols of the invention to the aqueous polymer/polyhalide complexes increases shelf life, prevents precipitation and inhibits against loss of available halogen.

The following examples are illustrative of certain specific embodiments of this invention. Unless otherwise noted, all parts and percentages are by weight.

EXAMPLES 1–16

IBr is formed by mixing 174 gm of bromine with 276 gm of iodine in a closed container with stirring and warming at 50° C. for 15–30 minutes. When the mixture becomes uniform, 261 gm of potassium bromide in 189 gm of deionized water are added and mixed to dissolve. This yields a 50 weight percent solution of IBr, present as KIBr$_2$.

A typical polyoxazoline polymer formed by polymerizing 2-ethyl-2-oxazoline (PEOx) having a molecular weight of about 100,000 is selected. This is then mixed with an equal amount of deionized water to yield a 50 percent by weight solution of PEOx.

Various combinations of these two solutions are prepared by mixing the KIBr$_2$ and PEOx solutions. Various co-solvents or alcohol degeneration inhibitors are added to the PEOx/polyhalide solutions at 10 percent and 20 percent by weight of the total solution. These are then placed in closed bottles and stored at 100° F. until phase separation or until 13 weeks pass. An uninhibited control is also tested. Solutions not degenerating in 13 weeks are analyzed for available IBr and are reported as a percent of original IBr present.

Results are presented in Tables I and II wherein "Weeks Survived" is the time when phase separation first occurs. In Table I the PEOx/IBr ratio is 70/30. In Table II the PEOx/IBr ratio is 50/50.

TABLE I
(70/30 ratio PEOx/IBr)

| Example Number | Stabilizer | Weeks Survived | Remarks |
|---|---|---|---|
| Control | None | 4 | formed two phases |
| 1 | 10% methanol | 13 | 95% IBr still available |
| 2 | 20% methanol | 13 | 95% IBr still available |
| 3 | 10% ethylene glycol | 6 | became turbid |
| 4 | 20% ethylene glycol | 10 | became turbid |
| 5 | 10% glycerine | 6 | formed two phases |
| 6 | 20% glycerine | 6 | formed two phases |
| 7 | 10% 2-methoxy-ethanol* | 13 | 95% IBr still available |
| 8 | 20% 2-methoxy-ethanol* | 13 | 95% IBr still available |

*DOWANOL ® EM

TABLE II
(50/50 ratio PEOx/IBr)

| Example Number | Stabilizer | Weeks Survived | Remark |
|---|---|---|---|
| Control | None | <2 | formed two phases |
| 9 | 10% methanol | 13 | 98% IBr still available |
| 10 | 20% methanol | 13 | 98% IBr still available |
| 11 | 10% ethylene glycol | 6 | formed two phases |
| 12 | 20% ethylene glycol | 10 | formed two phases |
| 13 | 10% glycerine | 3 | became turbid |
| 14 | 20% glycerine | 4 | became turbid |
| 15 | 10% 2-methoxy-ethanol* | 13 | 98% IBr still available |
| 16 | 20% 2-methoxy-ethanol* | 13 | 98% IBr still available |

*DOWANOL ® EM

An aqueous PEOx/polyhalide complex that contains a 90/10 ratio of PEOx/IBr is stable for 13 weeks at 100° F., and thus does not require the use of an inhibitor to maintain the solution integrity.

EXAMPLE 17

Aqueous PEOx/HIBr$_2$ compositions (5% as HIBr) at 90/10 and 70/30 PEOx/IBr ratios are not soluble in water.

An HIBr$_2$ stock solution is prepared by adding 30.7 parts I$_2$ and 19.4 parts Br$_2$ as a homogeneous mixture to 40.7 parts of 48 percent aqueous HBr and 9.3 parts deionized water. This yields a 50 percent IBr solution. Equal weights of PEOx with a molecular weight of 117,000 and water are mixed to yield a 50 percent PEOx stock solution.

10 Grams of the 50 percent IBr stock solution, 90 gm of the 50 percent PEOx stock solution and 20 gm of methanol are mixed together to form a solids free single phase solution having a 1.1 pH. After 16 days of storage in a closed container at 50° C., the solution remains a single phase and solids free.

EXAMPLE 18

0.8 Gram of 28 percent aqueous NH$_4$OH is added to 120 gm of a solution identical to that of Example 17.

This yields a pH of approximately 1.3. This solution also retains a solids free, single phase character after 16 days at 50° C.

EXAMPLE 19

In a similar fashion, 10 gm of the 50 percent IBr stock solution of Example 17, 23.3 gm of the 50 percent PEOx stock solution of Example 17, 66.7 gm of deionized water, 20 gm of methanol and 0.8 gm of 28 percent aqueous NH$_4$OH are mixed together. This soluton is a solids free single phase. After 3 days of storage at 50° C. the solution separates into 2 phases.

Examples 17-19 are analyzed for percent available IBr at the time they are made and at subsequent times as indicated in Table III. A sample of each was aged at room temperature 16 days and remained a solids free single phase.

TABLE III

| | Percent Available IBr | | |
|---|---|---|---|
| Example | Initial | 16 days 50° C. | 16 days R.T. |
| 17 | 4.0 | 2.5 | 4.0 |
| 18 | 4.0 | 2.6 | 4.0 |
| 19 | 4.1 | not soluble | 4.0 |

From this data it can be seen that Examples 17-19 form initially solids free solutions which they would not do without added methanol. One can also see that these solutions are stable at room temperature. However available IBr is lost upon aging at elevated temperatures.

Although this invention has been described in considerable detail through the above examples, such detail is for the purpose of illustration only, and should not be construed as a limitation upon the spirit of the invention or the scope of the appended claims.

What is claimed is:

1. A composition comprising:
   (a) a polymer containing a characterizing amount of units of the formula

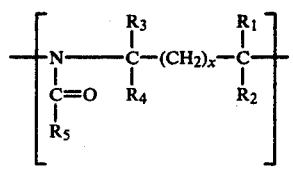

(I)

wherein R$_1$–R$_4$ are independently hydrogen, methyl or ethyl and wherein R$_5$ is hydrogen or an alkyl radical containing 1 to 3 carbon atoms and x is 0 or 1;

(b) IBrCl$^-$, IBr$_2^-$, BrCl$_2^-$ or mixtures thereof;

(c) a cation selected from the group consisting of alkali metal ions, alkaline earth metal ions, hydrogen ion, ammonium ion and mixtures thereof; said cation being obtained from a source independent of the polymer;

(d) water; and (e) a degeneration inhibiting amount of an alcohol of the formula:

R—(OCH$_2$CH$_2$)$_n$—OH wherein R is methyl, ethyl or 2-hydroxyethyl and n is a number from 0 to 3.

2. The composition of claim 1 wherein $R_1$–$R_4$ are hydrogen and $R_5$ is methyl or ethyl.

3. The composition of claim 2 wherein x is zero.

4. The composition of claim 3 wherein (b) is $IBr_2^-$.

5. The composition of claim 4 wherein (c) is an alkali metal ion.

6. The composition of claim 5 wherein (c) is sodium or potassium ion.

7. The composition of claim 5 wherein R in the alcohol is methyl.

8. The composition of claim 7 wherein n is zero.

9. The composition of claim 1 wherein the polymer consists essentially of mer units (I) and mer units of the formula

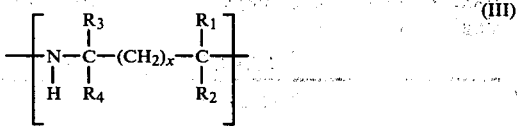

(III)

10. The composition of claim 9 wherein the mer unit (I) makes up at least about 75 percent of the mer units of the polymer.

11. The composition of claim 1 wherein the polymer is water soluble and contains a hydrophobe radical attached to at least one mer unit.

12. The composition of claim 1 wherein (b) is formed by the combination of interhalogen with halide ion in an interhalogen/halide ratio of from about 10:1 to about 1:2.

13. The composition of claim 12 wherein the ratio of interhalogen to halide is from about 2.5:1 to about 1:1.

14. The composition of claim 1 wherein the weight ratio of polymer to (b) is from about 99:1 to about 50:50.

15. The composition of claim 14 wherein the ratio of polymer to (b) is from about 90:10 to about 70:30.

16. The composition of claim 1 wherein the alcohol is present in at least 5 weight percent based on the total solution.

17. A method of degeneration inhibiting a composition comprising:
(a) a polymer containing a characterizing amount of units of the formula

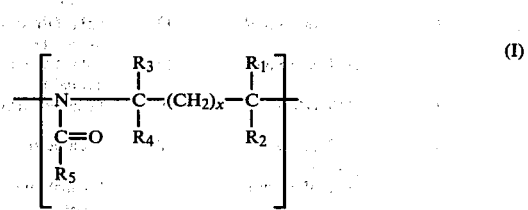

(I)

wherein $R_1$–$R_4$ are independently hydrogen, methyl or ethyl and wherein $R_5$ is hydrogen or an alkyl radical containing 1 to 3 carbon atoms and x is 0 or 1;

(b) $IBrCl^-$, $IBr_2$, $BrCl_2$ or mixtures thereof;

(c) a cation selected from the group consisting of alkali metal ions, alkaline earth metal ions, hydrogen ion, ammonium ion and mixtures thereof; said cation being obtained from a source independent of the polymer; and (d) water;

said method comprising admixing said composition with a degeneration inhibiting amount of (e) an alcohol of the formula:

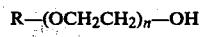

R—(OCH$_2$CH$_2$)$_n$—OH wherein R is methyl, ethyl or 2-hydroxyethyl and n is a number from 0 to 3.

18. A method for sanitizing substrates contaminated with microorganisms comprising contacting the substrate with the composition of claim 1.

* * * * *